US008034316B2

(12) United States Patent
Yurovskaya et al.

(10) Patent No.: US 8,034,316 B2
(45) Date of Patent: Oct. 11, 2011

(54) CARBON BLACKS HAVING LOW PAH AMOUNTS AND METHODS OF MAKING SAME

(75) Inventors: Irina S. Yurovskaya, Westford, MA (US); William L. Sifleet, Clinton, MA (US); Steven J. List, Bedford, MA (US); Martin C. Green, Boxborough, MA (US); Anand Prakash, Wilmington, MA (US)

(73) Assignee: Cabot Corporation, Boston, MA (US)

( * ) Notice: Subject to any disclaimer, the term of this patent is extended or adjusted under 35 U.S.C. 154(b) by 793 days.

(21) Appl. No.: 11/935,729

(22) Filed: Nov. 6, 2007

(65) Prior Publication Data

US 2008/0159947 A1 Jul. 3, 2008

Related U.S. Application Data

(60) Provisional application No. 60/864,750, filed on Nov. 7, 2006.

(51) Int. Cl.
*C22B 26/10* (2006.01)
*D01F 9/12* (2006.01)
*B01D 53/48* (2006.01)
*C01D 3/00* (2006.01)

(52) U.S. Cl. ............... 423/449.2; 423/499.1; 423/447.1; 423/232; 423/449.1

(58) Field of Classification Search .................. None
See application file for complete search history.

(56) References Cited

U.S. PATENT DOCUMENTS

| | | | |
|---|---|---|---|
| 2,833,736 A | 5/1958 | Glaser | |
| 3,607,813 A | 9/1971 | Purcell et al. | |
| 4,104,833 A | 8/1978 | Glowacki | |
| 4,308,061 A | 12/1981 | Iwahashi et al. | |
| 4,692,481 A | 9/1987 | Kelly | |
| 4,770,706 A | 9/1988 | Pietsch | |
| 4,995,197 A | 2/1991 | Shieh et al. | |
| 5,026,755 A | 6/1991 | Kveglis et al. | |
| 5,051,464 A | 9/1991 | Johnson et al. | |
| 5,190,739 A | 3/1993 | MacKay et al. | |
| 5,204,404 A | 4/1993 | Werner, Jr. et al. | |
| 5,266,361 A | 11/1993 | Schwarte et al. | |
| 5,266,406 A | 11/1993 | Den Hartog et al. | |
| 5,275,900 A | 1/1994 | Ong et al. | |
| 5,278,018 A | 1/1994 | Young et al. | |
| 5,314,945 A | 5/1994 | Nickle et al. | |
| 5,319,044 A | 6/1994 | Jung et al. | |
| 5,356,973 A | 10/1994 | Taljan et al. | |

(Continued)

FOREIGN PATENT DOCUMENTS

EP 0 720 066 B1 3/1999

(Continued)

OTHER PUBLICATIONS

SciFinder Abstract, Caponero et al., "Emissions of batch combustion of waste tire chips: the pyrolysis effect," Combustion Science and Technology, 2005, 177(2), 347-381, CAN 142:434784; AN 2005:153381, CAPLUS (copyright 2006).

(Continued)

*Primary Examiner* — Melvin Mayes
*Assistant Examiner* — Guinever Gregorio

(57) ABSTRACT

Carbon blacks, such as rubber blacks, having a low PAH concentration are described. Furthermore, elastomeric or rubber compositions containing the carbon black of the present invention are further described, as well as methods of making carbon black having a low PAH concentration.

53 Claims, 6 Drawing Sheets

Removal of PAH, % vs. Treatment Temperature, °C
Experimental data for V7H, heat treated in Nitrogen Naphthalene, MW=128　　Coronene, MW=300　　Total PAH

U.S. PATENT DOCUMENTS

| | | | |
|---|---|---|---|
| 5,484,574 | A | 1/1996 | Macaluso et al. |
| 5,484,575 | A | 1/1996 | Steenackers |
| 5,510,221 | A | 4/1996 | Matalevich et al. |
| 5,571,654 | A | 11/1996 | Ong |
| 5,763,388 | A | 6/1998 | Lightsey et al. |
| 5,869,550 | A | 2/1999 | Mahmud et al. |
| 6,024,135 | A | 2/2000 | Nobileau |
| 6,028,137 | A | 2/2000 | Mahmud et al. |
| 6,048,923 | A | 4/2000 | Mabry et al. |
| 6,086,841 | A | 7/2000 | Lee |
| 6,156,837 | A | 12/2000 | Branan, Jr. et al. |
| 6,251,983 | B1 | 6/2001 | Vogler et al. |
| 6,273,142 | B1 | 8/2001 | Braad |
| 6,323,273 | B1 | 11/2001 | Mahmud et al. |
| 6,348,181 | B1 | 2/2002 | Morgan |
| 6,476,154 | B1 | 11/2002 | Maly et al. |
| 6,485,693 | B1 | 11/2002 | Morgan |
| 6,489,389 | B1 | 12/2002 | Ohta et al. |
| 6,506,849 | B1 | 1/2003 | Hojo et al. |
| 6,518,350 | B1 | 2/2003 | Kobayashi et al. |
| 6,559,209 | B1 | 5/2003 | Araki et al. |
| 6,573,324 | B1 | 6/2003 | Cohen et al. |
| 6,646,028 | B2 | 11/2003 | Lopez-Serrano Ramos et al. |
| 6,767,945 | B2 | 7/2004 | Hahn et al. |
| 6,780,915 | B2 | 8/2004 | Yagi et al. |
| 6,815,473 | B2 | 11/2004 | Robert et al. |
| 6,837,288 | B2 | 1/2005 | McElrath et al. |
| 6,841,606 | B2 | 1/2005 | Yanagisawa et al. |
| 6,852,790 | B2 * | 2/2005 | Thielen et al. ............... 524/496 |
| 6,878,768 | B2 | 4/2005 | Tardivat et al. |
| 6,926,877 | B2 | 8/2005 | Green |
| 6,929,783 | B2 | 8/2005 | Chung et al. |
| 6,984,689 | B2 | 1/2006 | Penot et al. |
| 7,019,063 | B2 | 3/2006 | Wada et al. |
| 7,084,228 | B2 | 8/2006 | Labauze et al. |
| 7,101,922 | B2 | 9/2006 | Chen et al. |
| 7,105,595 | B2 | 9/2006 | Mabry et al. |
| 2003/0013797 | A1 | 1/2003 | Thielen et al. |
| 2005/0014884 | A1 | 1/2005 | Bhatt et al. |
| 2005/0063892 | A1 * | 3/2005 | Tandon et al. ............ 423/449.1 |
| 2005/0063893 | A1 | 3/2005 | Ayala et al. |

FOREIGN PATENT DOCUMENTS

| | | |
|---|---|---|
| WO | WO 94/019412 | 9/1994 |
| WO | WO 00/32701 | 6/2000 |

OTHER PUBLICATIONS

SciFinder Abstract, Kim et al., "Radial tire tread rubber for truck and bus excellent in heat resistance using low toxicity softening agent," Replub. Korean Kongkae Taeho Kongbo, 2002, CAN 142:178366; AN 2004:929784, CAPLUS (copyright 2006).

SciFinder Abstract, Kim et al., "Tire rubber composition having reduced polycyclic aromatic hydrocarbon content," Replub. Korean Kongkae Taeho Kongbo, 2001, CAN 142:75918; AN 2004:869526, CAPLUS (copyright 2006).

SciFinder Abstract, MISE, "Carbon black for electrophotographic toner," Nippon Gazo Gakkaishi, 2004, 43(5), 334-336, CAN 142:465103; AN 2004:863547, CAPLUS (copyright 2006).

SciFinder Abstract, Mastral et al., "Three-Ring PAH Removal from Waste Hot Gas by Sorbents: Influence of the Sorbent Characteristics," Environmental Science and Technology, 2002,, 36(8), 1821-1826, CAN 136:358795; AN 2002:164432, CAPLUS (copyright 2006).

SciFinder Abstract, Mastral et al., "Effects of CO2 on the Phenanthrene Adsorption Capacity of Carbonaceous Materials," Energy and Fuels, 2002, 16(2), 510-516, CAN 136:251576; AN 2002:64508, CAPLUS (copyright 2006).

SciFinder Abstract, Hirasa et al., "Anticlogging water-thinned carbon black-containing inks," Jpn. Kokai Tokkyo Koho, 2001, 6 pp., CAN 136:55375; AN 2001:927400, CAPLUS (copyright 2006).

SciFinder Abstract, Harmon et al., "Thermally enhanced vapor extraction for removing PAHs from lampblack-contaminated soil," Journal of Environmental Engineering, 2001, 127(11) 986-993, CAN 136:139168; AN 2001:800071, CAPLUS (copyright 2006).

SciFinder Abstract, Rivin et al., "Sorption of bioactive materials on carbon," Carbon, 1987, 25(1), 135-45, CAN 106:126573; AN 1987:126573, CAPLUS (copyright 2006).

SciFinder Abstract, Bevan et al., "Elution of polycyclic aromatic hydrocarbons from carbon blacks into biomembranes in vitro," Toxicology and Industrial Health, 1985, 1(1), 57-67, CAN 104:163502; AN 1986:163502, CAPLUS (copyright 2006).

SciFinder Abstract, Golitsyn et al., "Carbon black for electrically conducting compositions," U.S.S.R., 1984, CAN 102:115928; AN 1985:115928, CAPLUS (copyright 2006).

SciFinder Abstract, Alsberg et al., "Evaluation of extraction methods for carbon black; POM analysis and mutagenicity assay," Polynucl. Aromat. Hydrocarbons: Phys. Biol. Chem., Int. Symp., $6^{th}$ (1982), Meeting date: 1981, 73-82; CAN 99:48722; AN 1983:448722, CAPLUS (copyright 2006).

SciFinder Abstract, Glebko et al., "Vulcanizable unsaturated rubber stock," U.S.S.R., 1982, CAN 96:219105; AN 1982:219105, CAPLUS (copyright 2006).

SciFinder Abstract, Glebko et al., "Vulcanizable unsaturated rubber stock," U.S.S.R., 1982, CAN 96:219104; AN 1982:219104, CAPLUS (copyright 2006).

SciFinder Abstract, Meilakhs et al., "Vulcanizable polymeric composition based on stereoregular rubber," U.S.S.R., 1981, CAN 96:124321; AN 1982:124321, CAPLUS (copyright 2006).

SciFinder Abstract, Stenberg et al., "Vaccum sublimation and solvent extraction of polycyclic aromatic compounds adsorbed on carbonaceous materials," Analytical Chemistry, 1981, 53(13), 2067-72; CAN 95:161442; AN 1981:561442, CAPLUS (copyright 2006).

SciFinder Abstract, Cavana et al., "Aromatic polycyclic hydrocarbon content in some types of carbon black used as fillers in autovehicle tires," Journal of Commodity Science, 1980, 19(3), 223-30; CAN 94:193470; AN 1981:193470, CAPLUS (copyright 2006).

SciFinder Abstract, Taylor et al., "Solvent extracts of carbon black—determination of total extractables and analysis for benzo[a]pyrene," American Industrial Hygiene Association Journal, 1958-1999 (1980), 41(11), 819-25, CAN 94:108327; AN 1981:108327, CAPLUS (copyright 2006).

SciFinder Abstract, Lamond et al., "Reducing the polycyclic aromatic hydrocarbon content of carbon black," U.S., 1979, 4 pp., CAN 90:139709; AN 1979:139709, CAPLUS (copyright 2006).

International Search Report and Written Opinion of the International Searching Authority for PCT/US2007/083747 mailed Jun. 3, 2008.

* cited by examiner

| Name | CAS number | MW | Structure -picture |
|---|---|---|---|
| 1 Benzo(a)anthracene | 56-55-3 | 228.29 |  |
| 2 Benzo(a)pyrene | 50-32-8 | 252.31 |  |
| 3 Benzo(e)pyrene | 192-97-2 | 252.31 |  |
| 4 Benzo(b)fluoranthrene | 205-99-2 | 252.31 |  |
| 5 Benzo(j)fluoranthrene | 205-82-3 | 252.31 |  |
| 6 Benzo(k)fluoranthrene | 207-08-9 | 252.31 |  |
| 7 Chrysene | 218-01-9 | 228.29 |  |
| 8 Dibenzo(a,h)anthracene | 53-70-3 | 278.35 |  |
| 9 Naphthalene | 91-20-3 | 128.17 |  |
| 10 Acenaphthylene | 208-96-8 | 152.19 |  |
| 11 Acenaphthene | 83-32-9 | 154.21 |  |
| 12 Fluorene | 86-73-7 | 166.22 |  |
| 13 Phenanthrene | 85-01-8 | 178.23 |  |
| 14 Anthracene | 120-12-7 | 178.23 |  |
| 15 Fluoranthene | 206-44-0 | 202.35 |  |
| 16 Pyrene | 129-00-0 | 202.35 |  |
| 17 Benzo(g,h,i)perylene | 191-24-2 | 276.33 |  |
| 18 Indeno(1,2,3-cd)pyrene | 193-39-5 | 276.33 |  |
| 19 Cyclopenta(c,d)pyrene | 27208-37-3 | 226.27 |  |
| 20 Benzo(g,h,i)fluoranthene | 203-12-3 | 226 |  |
| 21 Perylene | 198-55-0 | 252.31 |  |
| 22 Anthanthrene | 191-26-4 | 276.33 |  |
| 23 Coronene | 191-07-1 | 300.35 |  |

Figure 1

Heat treatment of black causing desorption of PAH as the treatment temperature increased. The adsorption curve shown above is a hypothetical one, which shows the condensation of PAH from tailgas on carbon black as the stream is cooled.

Total PAH content of hot-gas separated CB is negligible compared to control samples.

The compound properties are not affected by removal of PAH via hot gas separation

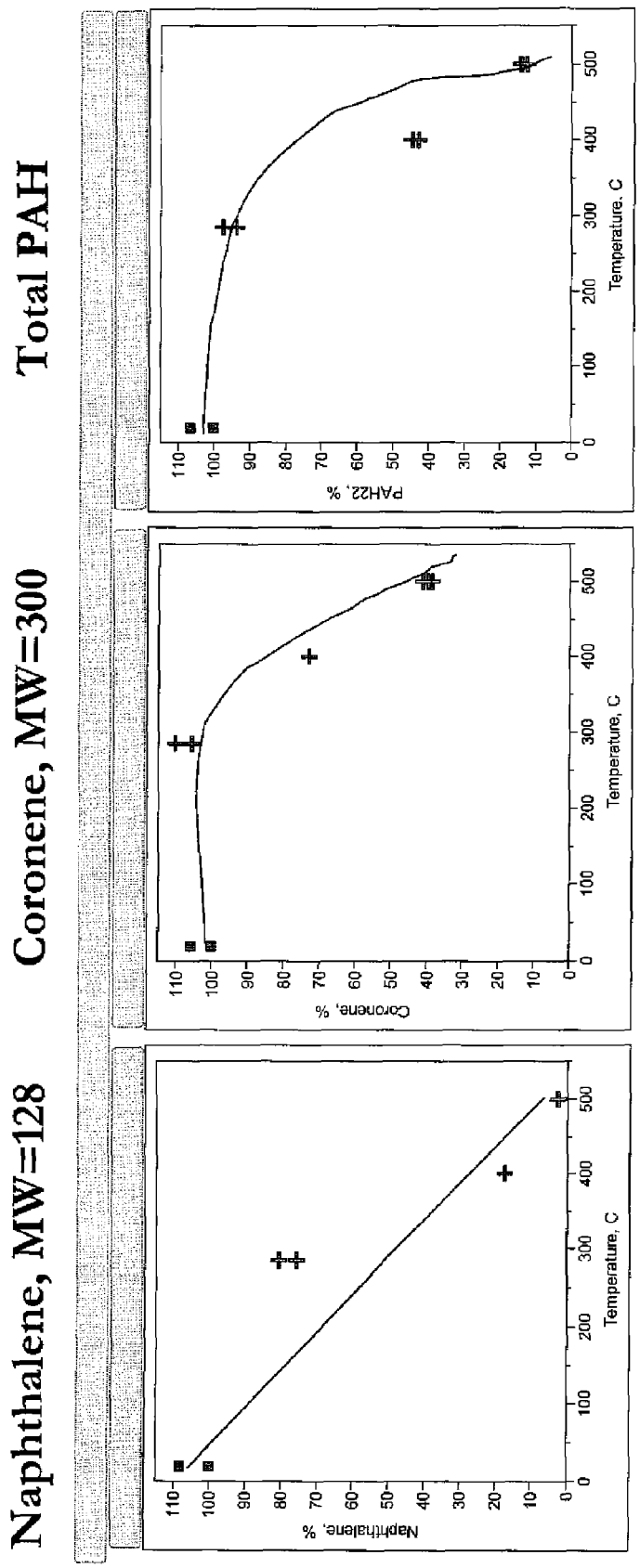

CARBON BLACKS HAVING LOW PAH AMOUNTS AND METHODS OF MAKING SAME

This application claims the benefit under 35 U.S.C. §119 (e) of prior U.S. Provisional Patent Application No. 60/864,750, filed Nov. 7, 2006, which is incorporated in its entirety by reference herein.

BACKGROUND OF THE INVENTION

The present invention relates to carbon blacks, compositions containing the carbon blacks, such as elastomeric or rubber compositions, methods of making the carbon blacks, as well as methods of using the carbon blacks.

Industrially manufactured carbon black is produced by pyrolysis of hydrocarbons at high temperatures under controlled process conditions. Under these conditions, trace levels of polyaromatic hydrocarbons, also known as PAHs, form on the carbon black surface.

Some PAHs have the potential to cause adverse health effects. Although the PAHs that are adhered to the carbon black are not readily available for human exposure, actions are being taken by both EU regulators and customers to reduce the concentration of PAHs in carbon black (See Borm P J, et. al., *Formation of PAH-DNA adducts after in vivo and vitro exposure of rats and lung cells to different commercial carbon blacks*, Toxicology and Applied Pharmacology, 2005 Jun. 1; 205(2): 157-167.). Recent examples include:

Promulgation of EU directive 2007/19/EC which harmonizes the rules for the plastic materials and articles intended to come in contact with food. The directive establishes a Benzo(a)pyrene content of 0.25 mg/kg in carbon black. Previous to this directive, no PAH limit existed for carbon black.

Promulgation of EU directive 2005/69/EC which regulates the content of PAHs in extenders oils used for the production of tires. This directive does not directly regulate the content of PAHs in carbon black; however, the EU has chosen to restrict the content of PAHs in extender oils and blends used to produce tires, in order to reduce the total annual emissions of PAHs, as required in the 1998 Protocol to the 1979 Convention on Long Range Transboundary Air Pollution on Persistent Organic Pollutants.

The above listed examples demonstrate the growing trend towards lower PAH carbon blacks.

While there is a growing desire to have lower PAHs for carbon blacks, any reduction in PAH cannot compromise the desirable performance properties of carbon black in rubber and other applications. Thus, it is desirable to reduce PAH concentration in carbon black without sacrificing the properties achievable by the current carbon blacks.

SUMMARY OF THE PRESENT INVENTION

A feature of the present invention is to provide carbon blacks having low PAH amounts.

A further feature of the present invention is to provide carbon blacks having low PAH amounts which retain acceptable physical properties in rubber and other applications.

A further feature of the present invention is to provide methods of making carbon blacks having low PAH amounts.

An additional feature of the present invention is to provide rubber blacks having desirable rubber properties, and yet having low PAH amounts.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a carbon black having a low PAH amount, such as a low total concentration for a defined group of 22 PAH compounds (see FIG. 1). For purposes of the present invention, the PAH22 is a measurement of the PAHs identified in FIG. 1 except for Benzo(j)fluoranthrene. Also, the PAH8 for purposes of the present invention is a measurement of Benzo(a)anthracene, Benzo(a)pyrene, Benzo(e)pyrene, Benzo(b)fluoranthrene, Benzo(j)fluoranthrene, Benzo(k)fluoranthrene, Chrysene, and Dibenzo(a,h)anthracene. BaP is a reference to Benzo(a)pyrene. For instance, the carbon black can have a low total concentration for the 22 PAHs on the order of 500 ppm or less, such as 300 ppm or less, 100 ppm or less, or 75 ppm or less, or 30 ppm or less.

The present invention further relates to elastomeric or rubber compositions containing at least one carbon black of the present invention in the elastomeric or rubber composition along with at least one elastomer or polymer or rubber.

The present invention also relates to a method of making carbon blacks having a low PAH total concentration which includes the step of subjecting the carbon black to sufficient heat to remove at least a portion of the PAHs from the carbon black and/or subjecting the carbon black to a solvent extraction to remove at least a portion of the PAHs from the carbon black. The present invention also relates to a method to produce carbon black having low PAR amounts, wherein during manufacturing of carbon black involving the presence of hot tail gas containing a carbon black and PAH, the method comprises removing the hot tail gas (or at least a portion thereof) with PAH from the carbon black.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 1 is a table of 22 PAH compounds (except for Benzo (j)fluoranthrene) which are considered the "PAH 22" for purposes of the present invention.

FIG. 6a-c are graphs showing the reduction of naphthalene, coronene, and total PAH 22 content that are reduced in a VULCAN 7H carbon black over a variety of temperature.

DETAILED DESCRIPTION OF THE PRESENT INVENTION

Figure 2:
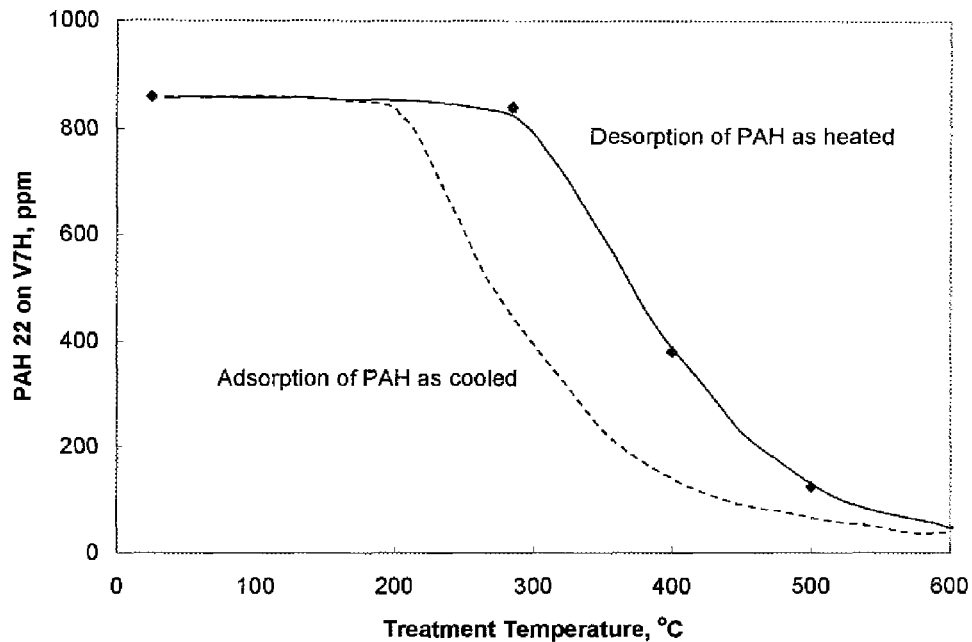
FIG. 2 is a graph showing PAH 22 versus Treatment Temperature.

The present invention relates to carbon blacks having a low PAH amount, such as a low PAH 22. The present invention also relates to rubber compositions or elastomeric compositions containing at least one carbon black of the present invention, along with at least one elastomer. The present invention further relates to methods of making the carbon blacks of the present invention.

In at least one embodiment of the present invention, the present invention relates to a carbon black having a low PAH amount. The carbon black can be formed so that the carbon black has a low PAH amount or commercially-available carbon black can be properly treated to remove PAHs so as to form carbon blacks having a low PAH amount. The carbon black of the present invention can have a low PAH amount with any standard ASTM carbon black specifications, for instance with respect to iodine absorption, DBPA, crushed DBPA, CTAB, nitrogen surface area, STSA, and/or tinting strength, and the like. The carbon black can be an ASTM specification carbon black, such as a N110, N121, N220, N231, N234, N299, N326, N330, N339, N347, N351, N358, N375, N539, N550, N650, N660, N683, N762, N765, N774, N787, and/or N990 carbon black, which has the ASTM specification properties for the particular N-series carbon black. The carbon black can have a STSA ranging from 20 $m^2/g$ to 150 $m^2/g$ or higher. The carbon black can be any ASTM grade carbon black having the low PAH amount, such as from a N110 ASTM carbon black to a N990 ASTM carbon black and more preferably a N 110 to N500 ASTM carbon black. Any commercial grade of carbon black can be formed to have a low PAH amount and/or can be subsequently treated to have a low PAH amount based on the present invention. The carbon black can be a furnace black, channel black, lamp black, thermal black, acetylene black, plasma black, a carbon product containing silicon-containing species, and/or metal containing species and the like.

In at least one embodiment of the present invention, the present invention relates to one or more carbon blacks having a low PAH amount (for purposes of the present invention, the PAH content is measured/tested by the method described at 21 CFR part 17B, FDA Federal Register, v62, #90. Friday May 9, 1997, incorporated in its entirety by reference herein) and, optionally, has the ability to impart at least one beneficial mechanical property in a rubber matrix, or an elastomeric composition. The at least one beneficial mechanical property can be one or more of the following:

abrasion resistance (21% slip)—tested per U.S. Pat. No. 4,995,197.

elongation (%)—ASTM D 3191-02 Standard Test Methods for Carbon Black in SBR—Recipe and Evaluation Procedures.

tensile strength (Mpa); ASTM D 3191-02 Standard Test Methods for Carbon Black in SBR—Recipe and Evaluation Procedures.

100% modulus (Mpa); ASTM D 3191-02 Standard Test Methods for Carbon Black in SBR—Recipe and Evaluation Procedures.

300% modulus (Mpa); ASTM D 3191-02 Standard Test Methods for Carbon Black in SBR—Recipe and Evaluation Procedures.

ratio of 300% modulus/100% modulus (M300%/M100%); ASTM D 3191-02 Standard Test Methods for Carbon Black in SBR—Recipe and Evaluation Procedures.

bound rubber (%); S. Wolff, M-J Wang, E-H Tan, Rubber Chem Techn, v 66, 163 (1993).

max tan delta @ 0° C. tested with ARES/Rheometrics Dynamic Spectrometer TI (RDS II, Rheometrics, Inc., N.J.) operated in a torsion strain mode (shear). The measurements were performed at 0° C. for strain sweeps with double strain amplitude (DSA) ranging from 0.2 to 120%, at a constant frequency of 10 Hz.

In one or more embodiments of the present invention, the carbon black of the present invention can have a low PAH amount and at least one of these beneficial mechanical properties, at least two, at least three, at least four, at least five, at least six, at least seven, and/or all eight of these beneficial mechanical properties. These mechanical properties are measured by known ASTM or published standards, which are provided next to each mechanical property above.

In at least one embodiment of the present invention, the present invention relates to a carbon black having a low PAH amount, such as a low PAH 22, wherein the carbon black has the ability to impart at least one beneficial mechanical property, as described above, wherein at least one of these mechanical properties is within 10% (e.g., within 5%, within 3%, within 1%) of the value for the same mechanical property for the same type of carbon black, having a high PAH, such as a high PAH 22. A high PAH 22 can be, for instance, 600 ppm or higher, such as 600 ppm to 1,000 ppm of PAH 22. The carbon black of the present invention, which has a low PAH amount and the ability to impart at least one beneficial mechanical property in a polymer matrix within 10% of the same mechanical property for the same type of carbon black having a high PAH, can be with respect to at least one beneficial mechanical property, at least two, at least three, at least four, at least five, at least six, at least seven, and/or all eight of these beneficial mechanical properties. In other words, the present invention has the ability to provide a carbon black having a low PAH amount, such as a low PAH 22, and yet impart at least comparable mechanical properties or rubber properties to a polymer matrix, such as an elastomer composition, wherein comparable is understood to mean within 10% (e.g., within 5% or within 1%) of the particular mechanical property.

For purposes of the present invention, a low PAH amount includes or is defined by a low PAH 22. As indicated above, a PAR 22 is a measurement of PAHs as set forth in FIG. 1 of the present application. For purposes of the present invention, a low PAH amount can be defined by a low PAH 22. Examples of suitable amounts include 500 ppm or less, 400 ppm or less, 300 ppm or less, 200 ppm or less, 150 ppm or less, 125 ppm or less, 100 ppm or less, 75 ppm or less, 50 ppm or less, 25 ppm or less, with respect to the amount of PAH 22 present in the carbon black. Suitable ranges include from about 1 ppm to about 500 ppm, 5 ppm to 500 ppm, 15 ppm to 500 ppm, 5 ppm to 50 ppm, 5 ppm to 100 ppm, 1 ppm to 100 ppm, or 1 ppm to 30 ppm, with respect to the total amount of PAH 22 present in the carbon black. For any of the ranges or amounts provided above, the lower limit can be 0.1 ppm, 1 ppm, 2 ppm, 5 ppm, 10 ppm, or 15 ppm. The ranges can be exact or approximate (e.g., "about 1 ppm" and the like). In at least one embodiment, these ppm ranges can apply to all or any number of PAHs (e.g., all PAHs or one or more of the PAHs). For purposes of the present invention, the PAH22 is a measurement of the PAHs identified in FIG. 1 except for Benzo(j)fluoranthrene. Also, the PAH8 for purposes of the present invention is a measurement of Benzo(a)anthracene, Benzo(a)pyrene, Benzo(e)pyrene, Benzo(b)fluoranthrene, Benzo(j)fluoranthrene, Benzo(k)fluoranthrene, Chrysene, and Dibenzo(a,h)anthracene. BaP is a reference to Benzo(a)pyrene.

In one or more embodiments, one or more of the carbon black of the present invention can have a PAH content of from about 0.15 to about 2 micrograms/m², such as from 0.2 to 1.5 micrograms/m², or from 0.3 to 1.25 micrograms/m², or from 0.4 to 1.0 micrograms/m², and the like.

In one or more embodiments, and optionally as a separate embodiment, the present invention relates to a carbon black having a PAH content of from about 0.15 to about 2 micrograms/m² wherein said PAH content is determined based on a PAH22 content, and optionally the carbon black can have any one or more of the characteristics and/or properties described herein, and optionally can be part of a polymer or rubber formulation (or other formulation) as described herein. Other ranges include from 0.2 to 1.5 micrograms/m², or from 0.3 to 1.25 micrograms/m², or from 0.4 to 1.0 micrograms/m², and the like.

In one or more embodiments, the present invention relates to a carbon black having a low PAH content. The PAH content can be determined and is preferably determined based on a PAH22 content as shown herein. The carbon black can be a furnace carbon black or other carbon black described herein. In one or more embodiments, the carbon black having the low PAH content is based upon a particular STSA range, a particular $I_2No$/STSA ratio, as well as a particular PAM content and, in some cases, a particular DBP range. In one or more embodiments, the carbon black of the present invention can be selected from one or more of the following groups:

a) STSA: 110-250 m²/g
$I_2No$ (mg/g)/STSA (m²/g). 1.2 to 0.70
PAH: 400 ppm or less
b) STSA: 80-110 m²/g
$I_2No$ (mg/g)/STSA (m²/g): 1.15 to 0.70
PAH: 30 ppm or less
c) STSA: 65-75 m²/g
$I_2No$ (mg/g)/STSA (m²/g): 1.10 to 0.88
PAH: 500 ppm or less;
DBP: 115-125 mL/100 g
d) STSA: 65-80 m²/g
$I_2No$ (mg/g)/STSA (m²/g): 0.70 to 0.88
PAH: 500 ppm or less
e) STSA: 1 to 35 m²/g
$I_2No$ (mg/g)/STSA (m²/g): 1.40 to 0.70
PAH: 50 ppm or less; or
f) STSA: 70 to 90 m²/g
$I_2No$ (mg/g)/STSA (m/g): 1.00 to 1.20
PAH: 50 ppm or less
DBP: 60-80 mL/100 g; or
g) STSA: 87-95 m²/g
$I_2No$ (mg/g)/STSA (m²/g): 0.91 to 1.08
PAH: 100 ppm or less
DBP: 109-119 mL/100 g.

The above groups provide a particular combination of properties and PAM content, which are especially useful in a variety of applications including, but not limited to, rubber or elastomer formulations (or other formulations) and the like.

With respect to each of the groups a) through g) above, the following are examples of particular ranges, sub-ranges, and the like which can be used.

a) STSA (m²/g): 110-200; 110-180; 110-175; 110-130; 115-250; 115-200; 115-180; 115-175; 120-250; 120-200; 120-175; 125-250; and/or
$I_2No$ (mg/g)/STSA (m²/g): 1.15-0.7; 1.2-0.7; 1.1-0.7; 1.0-0.7; 0.9-0.7; 1.0-0.8; 1.2-0.8; 1.2-0.9; 1.15-0.8; and/or
PAH (ppm): 350 or less; 300 or less; 250 or less; 200 or less; 50 or less; 1-150; 100 or less; 20 or less; 1-200; 5-200; 10-200; 10-100; 5-150; 5-100; 5-50; 1-50; 1-20; 1-10.
b) STSA (m²/g): 80-105; 80-100; 80-90; 82-110; 83-110; 83-105; 85-105; 90-110; 90-107; 83-100; and/or
$I_2No$ (mg/g)/STSA (m²/g): 1.10 or less; 1.15-0.7; 1.15-0.8; 1.10-0.75; 1.0-0.75; 1.15-0.85; and/or
PAH (ppm): 1-20; 10 or less; 1-10; 5-30; 1-30; 3-30; 1-15; 1-25.
c) STSA (m²/g): 66-68; 67-75; 70-75; 68-72; 69-70; 70-74; and/or
$I_2No$ (mg/g)/STSA (m²/g): 1.1-0.89; 1.1-0.90; 1.1-0.90; 1.0-0.96; 1.0-0.95; 1.05-0.90; and/or
PAH (ppm): 1-450; 400 or less; 350 or less; 300 or less, 250 or less; 200 or less; 175 or less; 150 or less; 125 or less; 100 or less; 75 or less; 55 or less, 45 or less; 1-5; 1-9; 1-8; 1-7; 1-6; 8 or less; 0.5-9.

An example of a carbon black of c) can be N-351 carbon black.

d) STSA (m²/g): 68-80; 70-80; 72-80; 70-77; 68-75; 72-80; 69-74; and/or
$I_2No$ (mg/g)/STSA (m²/g): 0.88-0.72; 0.85-0.72; 0.83-0.70; 0.85-0.7; 0.85-0.75; and/or
PAH (ppm); 400 or less; 200 or less; 150 or less; 1-100; 50 or less; 20 or less; 1-500; 1-400; 1-300; 1-200; 0.5-100; 0.5-50; 1-30; 1-25; 1-20; 1-10; 0.5-10; 0.5-5.
e) STSA (m²/g): 1-30; 3-25; 5-20; 7-20; 7-30; 2-20; 2-15; and/or
$I_2No$ (mg/g)/STSA (m²/g): 1.3 or less; 1.2 or less; 1.15 or less; 1.10 or less; 1.0 or less; 0.9 or less; 1.4-0.7; 1.3-0.7; 1.25-0.7; 1.2-0.7; 1.15-0.7; 0.9-0.7; 0.95-0.7; 0.75-0.7; and/or
PAH (ppm): 1-20; 20 or less; 1-50; 1-40; 1-30; 1-20; 1-10; 0.5-5; 3-50; 3-25.
f) STSA (m²/g): 70-87; 70-85; 73-90; 73-85; 73-80; 72-77; and/or
$I_2No$ (mg/g)/STSA (m²/g): 1.0-1.15; 1-1.1; 1.05-1.2; 1.05-1.15; and/or
PAH (ppm): 20 or less; 10 or less; 1-20; 1-50; 1-40; 1-30; 1-20; 1-10; 0.5-5; 3-50; 3-25; and/or
DBP (mL/100 g): 65-80; 70-80; 72-80; 65-78; 68-77; 69-76.

An example of a carbon black of f) can be N-326 carbon black.

g) STSA (m²/g): 90-95; 89-94; 90-94; and/or
$I_2No$ (mg/g)/STSA (m²/g): 0.92-1.07; 0.94-1.05; 0.96-1.03; 0.97-1.00; and/or
PAH (ppm). 80 or less; 60 or less; 50 or less; 40 or less; 30 or less; 20 or less; 10 or less; 1-20; 1-50; 1-40; 1-30; 1-20; 1-10; 0.5-5; 3-50; 3-25; and/or
DBP (mL/100 g): 110-115; 112-114; 111-118; 113-117.

An example of a carbon black of g) can be N-375 carbon black.

Optionally, in addition to the PAH22 content or separately, the PAH8 for carbon black a) can be 15 ppm or less (e.g., 12 ppm or less, 0.5 ppm to 10 ppm, 1 ppm to 5 ppm, 5 ppm or less). In addition or in the alternative, the BaP can be 4 ppm or less (0.1 ppm to 4 ppm, 0.5 ppm to 3 ppm). The carbon blacks of the present invention can have an equally lower PAH8 and in general can have a PAH8 that is at least 50% less (e.g., 50% to 80% lower) than the PAH 22 values described herein. Further, the BaP for the carbon blacks can be typically at least 75% lower (e.g., 75% to 95% lower) than the PAH22 values described herein.

In at least one embodiment of the present invention, the carbon black of the present invention can be a rubber grade or tire grade carbon black as that term is understood in the industry. The carbon black of the present invention, in at least one embodiment, can have a STSA (m²/g) of about 20 m²/g to 200 m²/g or from about 20 m²/g to 150 m²/g or from about 80 to about 140 m²/g. For instance, STSA can be from about 80 to about 100 m²/g or from about 80 to about 90 m²/g. As an option, the carbon black can have an Iodine No./STSA ratio of less than 1.0, such as 0.7 (or less) to 0.98.

In one or more embodiments, the carbon black of the present invention can have an $I_2$No./STSA ratio that is equal to or less than y, wherein $$y=0.004x+(0.6221)$$

where y=$I_2$No./STSA and x=STSA, wherein STSA can be 20 m²/g to 150 m²/g. Iodine number ($I_2$ No.) of the carbon blacks is determined according to ASTM Test Procedure D1510. STSA (statistical thickness surface area) is determined based on ASTM Test Procedure D-5816 (measured by nitrogen adsorption).

In at least one embodiment of the present invention, the carbon black, such as the rubber grade or tire grade carbon black, can have one or more of the following mechanical properties or rubber properties in combination with the STSA of from 20 m²/g to 150 m²/g or from 80 to about 140 m²/g, wherein the mechanical properties and/or rubber properties are determined when the carbon black in present in a rubber formulation according to ASTM D 3191-02 Standard Test Methods for Carbon Black in SBR—Recipe and Evaluation Procedures:
  abrasion resistance (21% slip) of from 80 to 170;
  elongation (%) of from 300 to 600;
  tensile strength (Mpa) of from 20 to 35;
  100% modulus (Mpa) of from 2.4 to 4.5;
  300% modulus (Mpa) of from 12 to 23;
  ratio of 300% modulus/100% modulus (M300%/1100%) of from 3.5 to 6;
  bound rubber (%) of from 15 to 30; and/or
  max tan delta@0° C. of from 0.25 to 0.4.

These properties can be achieved for one or more rubber compounds, and can be achieved when the rubber is natural rubber and/or SBR.

In one or more embodiments of the present invention, the present invention relates to a carbon black having a low PAH amount as described above, as well as a STSA of from 20 m²/g to 150 m²/g or from 80 to 140 m²/and having one or more of the following mechanical properties based on the formula provided for each property, wherein x is the STSA (m²/g) of the carbon black and y is the mechanical property.
  abrasion resistance (21% slip): y=5/6(x)+(43+/−10).

The other mechanical properties identified above can have the same or similar relationships with the STSA.

In one or more embodiments, the present invention relates to an elastomeric composition or rubber matrix containing a least one carbon black of the present invention and at least one elastomer. The carbon black can be used in the same proportions with respect to the elastomer that are commonly used for carbon blacks having similar morphology but higher levels of PAH. One of skill in the art will recognize that the appropriate proportion will depend upon the morphology of the carbon black, the matrix composition, and the desired use of the filled polymer. Depending on the surface area and structure, various carbon blacks may be employed at a loading of from about 10 phr to about 100 phr, for example, about 10 phr to about 60 phr.

Furthermore, there is no criticality as to the elastomers used in the present invention to form the elastomeric composition. One or more elastomers can be present, and the elastomers that can be used are conventional in the formation of elastomeric compositions, such as rubber compositions. The elastomer can be used in conventional amounts.

Any suitable elastomer may be compounded with the carbon blacks to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene The elastomer can have a glass transition temperature (Tg) as measured by differential scanning colorimetry (DSC) ranging from about −120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives such as chlorinated rubber. The carbon blacks of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The elastomeric compounds of the present invention may be additionally compounded with one or more coupling agents to further enhance the properties of the elastomeric compound. Coupling agents, as used herein, include, but are not limited to, compounds that are capable of coupling filters such as carbon black or silica to an elastomer. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto) propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

Elastomeric compositions disclosed in the present invention include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The elastomeric compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

The elastomeric compositions may include one or more curing agents such as, for example, sulfur, sulfur donors, activators, accelerators, peroxides, and other systems used to effect vulcanization of the elastomer composition. The following patents provide examples of various ingredients, such as curing agents, elastomers, uses, and the like which can be used in the present invention: U.S. Pat. Nos. 6,573,324; 6,559,209; 6,518,350; 6,506,849; 6,489,389; 6,476,154; 6,878,768; 6,837,288; 6,815,473; 6,780,915; 6,767,945; 7,084,228; 7,019,063; and 6,984,689. Each of these patents is incorporated in their entirety by reference herein.

The compositions (e.g., elastomeric or other compositions or formulations) of the present invention can contain, as an option, carbon blacks having a high PAH or can contain any conventional carbon blacks (or any other fillers or reinforcing agents), along with the carbon blacks of the present invention. Preferably, the amounts of the higher PAH carbon blacks or conventional carbon blacks is zero to minor amounts, such as 30% by weight or less of the total carbon black present (e.g., 0 wt % to 30 wt %, or 0.01 wt % to 10 wt %, or 0.01 wt % to 1 wt %).

Conventional techniques that are well known to those skilled in the art can be used to prepare the elastomeric compositions and to incorporate the carbon black. The mixing of the rubber or elastomer compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. Wet masterbatch methods for producing filled elastomeric compositions, such as those disclosed in U.S. Pat. Nos. 5,763,388, 6,048,923, 6,841,606, 6,646,028, 6,929,783, 7,101,922, and 7,105,595 may also be employed to produce elastomeric compositions containing carbon blacks according to various embodiments of the invention, and these patents are incorporated in their entirety by reference herein.

With respect to the elastomeric compositions or rubber matrices of the present invention, the elastomeric composition contains at least one carbon black of the present invention and at least one elastomer. The elastomeric composition can have one or more of the previously-identified mechanical properties in any of the embodiments identified above. Various articles of manufacture, including tires and industrial products, may contain at least one component comprised of an elastomeric composition of this invention. For example, the elastomeric composition of this invention may be used in forming a composite with reinforcing material such as in the manufacture of tires, belts or hoses. Preferably, the composition of the present invention is in the form of a tire and more specially as a component of a tire, including, for example, one or more of the tire's tread, wirecoat, beadcoat, sidewall, apex, chafer and plycoat.

The carbon blacks of the present invention can be made a variety of ways, For instance, one can start with a carbon black that is commercially available. Examples of starting materials include, but are not limited to, commercially available rubber grade carbon black or tire grade carbon blacks, which include N234 carbon blacks. The carbon black can be a N100 series, N200 series, N300 series, N400 series, N500 series, N600 series, and/or N700 series of carbon black. For instance, carbon blacks that can be used include, but are not limited to, N110 to N990 ASTM carbon blacks (e.g., N110, N121, N220, N231, N234, N299, N326, N330, N339, N347, N351, N358, N375, N539, N550, N650, N660, N683, N762, N765, N774, and/or N990). The carbon black can be a N220 to N375 ASTM carbon black. Commercially available examples of starting materials include, but are not limited to, Vulcan® 7H carbon black and Vulcan® J carbon black from Cabot Corporation. The commercially available carbon blacks can then be treated to remove at least a portion of the PAH with the carbon black, which is generally on the surface of the carbon black. Generally, the amount of PAH removed, and more preferably the PAH 22 removed, is an amount sufficient to achieve the low PAH values identified above.

The carbon blacks of the present invention can be prepared with respect to the STSA parameter and the $I_2$No/STSA from commercially available techniques which are used to form, for instance, Vulcan® grade carbon blacks, Sterling® grade carbon blacks, Regal® carbon blacks, Black Pearl® carbon blacks, ASTM grade carbon blacks, rubber grade carbon blacks, Spheron® carbon blacks, and the like. Specific examples include, but are not limited to, ASTM 121 carbon black, Vulcan® 10 carbon black, Vulcan® 10H carbon black, Vulcan® M carbon black, Vulcan® J carbon black, Regal® 300 carbon black, Vulcan® 3 carbon black, Vulcan® 3H carbon black, Vulcan® K carbon black, Sterling® SO carbon black, Sterling® NS1 carbon black, Regal® 85 carbon black, Spheron® 5000 carbon black, and the like. While the techniques used to commercially make various carbon blacks having the STSA and/or $I_2$No/STSA ratio can be used, the techniques explained herein with respect to achieving, at the same time, the desirable low PAH range are to be used in combination in order to produce a combination of suitable parameters, which are useful in a variety of applications, including rubber and elastomer formulations, and other formulations and applications.

An example of a process to remove the PAH can include subjecting or treating the carbon black having the higher PAH to/with sufficient heat, optionally in an inert (e.g., nitrogen) or vacuum atmosphere, such that the PAH or a portion thereof is removed. The carbon black can be, for instance, subjected to a sufficient temperature on the order of from about 300° C. to about 500° C. (or higher, such as 500° C. to 950° C.) to remove a substantial portion of the PAH from the carbon black to achieve the desirable low PAH values provided above. The heating can occur for any time sufficient to achieve the removal of the PAH, such as from about 10 minutes to about 10 hours or more. The heating can occur in any type of furnace or other device capable of subjecting particulates to heat and preferably in an inert or vacuum atmosphere. The temperature with regard to the heat treatment is with respect to the temperature that the carbon black achieves and this temperature can be from 300° C. to 500° C., such as 350° C. to 500° C., or 400° C. to 500° C., and the like. Temperatures above 500° C. can be used, such as 500° C. to 750° C. or from 500° C. to 950° C. or higher.

In another process, the PAH can be removed or reduced from the carbon black by subjecting the carbon black to a solvent extraction process, such as a Soxhlet extraction using an organic solvent, such as toluene. Other examples of suitable solvents that can be used include, but are not limited to, acetone, hexane, cyclohexane, methylene chloride, xylene, dimethyl sulphoxide, tetrahydrofuran, or any mixtures of these. Generally, any amount of the solvent can be used. For instance, for 100 grams of carbon black, 250 mls to 1 liter (or more) of solvent can be used, and amounts below or above these ranges can be used. The extraction can be an hour or more, such as for 24 hours or more, especially with respect to a Soxhlet extraction. A carbon black can be subjected to multiple treatments (e.g., heat and solvent extraction, multiple heat treatments, and/or multiple solvent extractions with the same or different solvents).

With respect to forming carbon black with low PAH amounts, this process can be conducted right after the carbon black is formed or can be used with carbon black previously made. Thus, the processes of the present invention can be incorporated into a continuous process to make carbon black. In addition, in the present application, carbon blacks can be formed having a low PAH amount during the manufacturing of carbon black, for instance, wherein the hot tail gas from a carbon black manufacturing process is removed so that the PAHs do not condense on the carbon black during the manufacturing process. The carbon black that can be formed by this process can be any carbon black previously described earlier or other grades. The carbon black can be separated from the gas phase at a temperature of from about 260° C. to about 950° C., such as about 750° C. or about 800° C., such that the PAH in gas form can be easily removed, and this temperature is low enough that it does not affect the surface of the carbon black. Other temperature ranges include from 300° C. to 900° C., from 400° C. to 900° C., from 500° C. to 900° C., from 600° C. to 900° C., from 650° C. to 900° C., from 700° C. to 850° C., and the like or approximations thereof. Any carbon black, such as any ASTM grade carbon black, can be made in this manner and achieve a low PAH amount.

For example, it is believed that heat treatment, such as in inert atmosphere, allows the PAH compounds to be volatilized and subsequently desorbed from the surface of carbon black leaving the other surface chemistry unaffected. FIG. 2 shows the reduction in PAH 22 for V7H as a function of heat treatment temperature in nitrogen atmosphere. The graph shows that as treatment temperature is increased, total PAH levels are reduced, and at a temperature of about 500° C. almost 75 wt % of the PAHs were removed. In the reactor, the PAH molecules, synthesized by the pyrolytic process exist in the gas phase, and as the black is cooled to temperatures below 200° C., a majority of the PAHs condense on the surface of carbon black. Due to the hysteresis between desorption and adsorption curves, it is possible to remove equal amounts of PAH at much lower temperature on the adsorption curve, than on the desorption curve. Thus, carbon black can be separated from tail gas at high temperatures, while the PAHs are still in gas phase, and the process will produce low PAH amount carbon blacks.

Thus, in one or more embodiments, the present invention relates to the production of a carbon black of the present invention, wherein the method comprises subjecting or treating a carbon black having a PAH above 500 ppm to/with sufficient heat, optionally in an inert or vacuum atmosphere, such that the PAH or a portion thereof is removed to form said carbon black. The heat can be on the order of from about 300° C. to about 950° C., wherein the heat is the temperature that the carbon black will reach.

In one or more embodiments, the carbon black of the present invention can be formed during the manufacturing of carbon black, which involves the presence of hot tailgas containing a carbon black and PAH. The method comprises removing the hot tailgas that contains the PAH in any manner from the carbon black. The hot tailgas can be at a temperature of from 260° C. to about 950° C., such as 400° C. to about 900° C., or from about 500° C. to about 950° C., while the hot tailgas is being removed from the carbon black. The manufacturing of the carbon black in this process can occur in a conventional furnace carbon black reactor using a conventional process, such as described in U.S. Pat. Nos. 6,926,877; 6,485,693; 6,273,142; 6,024,135; 6,348,181; 6,156,837; 6,086,841; and 5,190,739, with the differences or changes noted herein. In one or more embodiments, a cyclone or cyclone filter is used to separate the hot tailgas from the carbon black, so that the carbon black can be recovered without high PAH contents. In the alternative, or in combination, a high temperature filter can be used as described above. In the process, the process can include lowering or reducing the carbon black temperature, once removed from the tailgas, to a temperature below 400° C. or below 200° C. prior to introducing the recovered carbon black into a bag filter or other storing container. Any manner to lower the carbon black temperature to below 200° C. or to below 400° C. can be used, such as a cool inert gas, or other cooling mechanisms, such as a cooling jacket, and the like. For instance, a steam fluidized bed can be used. The separation of the hot tailgas from the carbon black can occur at any point once the hot tailgas is no longer needed for purposes of forming the carbon black at the desired specifications. The hot tailgas can be removed generally prior to the quench and after carbon black formation in the tailgas. With the present invention, and unlike previous conventional carbon black manufacturing processes, the hot tailgas is not cooled down to lower the tailgas temperature, but instead, the hot tailgas is removed from the carbon black. By doing so, the hot tailgas can then be recycled for any use. For instance, the hot tailgas can be recycled to the same or different carbon black furnace reactor, for instance, using the system described in WO 2000/032701, incorporated in its entirety by reference herein, wherein the dewatering step can be skipped. Also, or as an alternative, the hot tailgas can be recycled by being used as a heat source for any energy needs. In the alternative, or in addition, the recycled hot tailgas can be directed to one or more dryers, such as carbon black dryers, and serve as a heat source or partial heat source to the dryer. For instance, carbon black dryers are used to dry carbon black and, therefore, require a substantial heat source to generate a high enough temperature to remove the moisture from the carbon black. The recycled hot tailgas can be directed to the dryer and serve as at least a partial heat source to the dryer. It is noted that by being at least a part of the heat source to the dryer, temperatures can be sufficiently reached such that the PAH in the tailgas is partially or totally destroyed. In other words, the PAH in the tailgas will be broken down into non-PAH molecules or otherwise considered no longer a PAH. Thus, not only does this recycling provide a use for the hot tailgas, it further leads to a beneficial breakdown of the PAH such that it no longer poses a risk as a PAH.

For purposes of the present invention, a short quench carbon black is a carbon black formed by a process wherein the carbon black, after formation from pyrolysis, is subjected a short quench to stop the carbon black forming reactions. The short quench is a parameter of the furnace carbon black manufacturing process that assures the value of the CB Toluene Discoloration (tested per ASTM D1618) of 95%, or lower. In the process of the present invention, the process of removing the PAH from the carbon black is especially useful where the carbon black is formed in a furnace (e.g., furnace-type blacks) and are especially effective where the carbon blacks are formed from the use of a short quench, as that term is understood. Examples of short quench carbon blacks include, but are not limited to, Vulcan® 7H carbon black, Vulcan® J carbon black, Vulcan® 10H carbon black, Vulcan® 10 carbon black, Vulcan® K carbon black, Vulcan® M carbon black, and N-121 carbon black. In one or more embodiments, the present invention thus relates to a short quench carbon black having a PAH content of 100 ppm or less. The short quench carbon black can be a furnace carbon black. The PAH content is determined based on a PAH22 content. The short quench carbon black can be a N110 to N787 ASTM carbon black. The short quench carbon black can have any of the parameters described above with respect to PAH content, STSA, $I_2$No (mg/g)/STSA ($m^2$/g) ratio, DBP, and the like.

Furthermore, in the present invention, the present invention can selectively remove certain types of PAHs from the carbon black. For instance, low molecular weight PAHs on the order of less than 200 (e.g., 1 to 199) can be substantially removed by the processes of the present invention. The low MW PAHs can have the ppm levels referenced above for the PAH 22. Also, the type of processes can selectively remove PAHs or a greater percent of them. For instance, heating can remove the following PAHs in a greater percent: coronene, fluoranthene, acenaphthylene, cyclopenta(cd)pyrene, anthanthrene, or indenopyrene. Solvent extraction can remove the following PAHs in a greater percent: pyrene, naphthalene, benzo(e) pyrene, benzo(ghi)fluoranthene, or 1,12 benzperylene.

The carbon black of this invention may be used in the same applications as conventional carbon blacks. More than one type of carbon black of the present invention can be used in any formulation, composition, or application.

Carbon black according to the invention can be used in a number of end use applications. These uses include, for example, plastic compositions, inks, toners, printing plates, coatings, rubber compositions, paper compositions, moldings, molding compositions, films, pipes, and textile compositions.

The carbon black of this invention may be used as pigments or colorants in any matrix, such as in a plastic material. The carbon black of the invention can also be used to impart conductivity to a plastic material.

The carbon black can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) amino (melamine and urea); (4) epoxies; (5) phenolics; (6) polyesters; (7) silicones; and (8) urethanes.

Generally, the carbon black product is added like any other pigment to the plastic used to form a plastic premix. This can be done, for example, in a dry mix or a melt stage. The carbon black of the invention may be used in combination with other conventional additives in plastic compositions. According to the invention, the term plastic composition includes, but is not limited to, any plastic material, article, goods, surface, fabric, sheet, and the like. For example, plastic materials include automotive parts, siding for homes, liners for swimming pools, roofing materials, packaging materials, and any variety of other household or industrial items.

The carbon black of this invention is also useful in ink formulations. Other ink additives may be incorporated into the ink formulation.

In general, an ink consists of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of aqueous inks, see The Printing Manual, 5th Ed., Leach et al, Eds. (Chapman and Hall, 1993). Various aqueous ink compositions are also disclosed, for example, in U.S. Pat. Nos. 2,833,736, 3,607,813, 4,104,833, 4,308,061, 4,770,706, and 5,026,755. An another example, flexographic inks represent a group of ink compositions. Flexographic inks generally include a colorant, a binder, and a solvent.

The carbon black of the invention, either as predispersion or as a solid, can be incorporated into an ink formulation using standard techniques.

The carbon black of the invention can be used in news inks. For example, an aqueous news ink composition may comprise water, the carbon black of the invention, a resin and conventional additives such as antifoam additives or a surfactant.

The carbon black of the invention may also be used in coating compositions such as paints or finishes. Other known aqueous coating additives may be incorporated the coating compositions. See, for example, MCGRAW-HILL ENCYCLOPEDIA OF SCIENCE & TECHNOLOGY, $5^{th}$ Ed. (McGraw-Hill, 1982). See also U.S. Pat. Nos. 5,051,464; 5,319,044; 5,204,404; 5,051, 464; 4,692,481; 5,356,973; 5,314,945; 5,266,406; and 5,266, 361.

The carbon black of the invention may also be used in paper compositions. Accordingly, the invention relates to an improved paper product comprising paper pulp and a carbon black.

The paper products of the invention may incorporate other known paper additives such as sizing agents, retention aids, fixatives, fillers, defoamers, deflocculating agents, and the like.

The carbon black of the invention may also be used, as with conventional carbon blacks, as pigments, fillers, and reinforcing agents in the compounding and preparation of rubber compositions.

Carbon blacks of the present invention, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed state. Tires with lower hysteresis values reduce rolling resistance and therefore are able to reduce the fuel consumption of the vehicle utilizing the tire. Thus, it is particularly desirable to have carbon black capable of imparting greater abrasion resistance and lower hysteresis in tires.

The carbon black of this invention may also be used to color fibers or textiles. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk and linen are used.

The carbon black of the present invention can be used to color fibers and textiles with, for example, direct and acid dyes. For a general discussion of coloring with dyes, see KIRK-OTHMER ENCYCLOPEDIA OF CHEMICAL TECHNOLOGY, Vol. 8, pp. 280-350, "Dyes, Application and Evaluation" (John Wiley and Sons, 1979).

With respect to toners or toner resins, suitable toner resins for use in the toner and developer compositions of the present invention include a styrenic polymer-based, such as a styrenated acrylic resin. Examples of preferred styrenic polymer-based resins include, but are not limited to, homopolymers and copolymers of styrene and its derivatives such as: polystyrene; poly-p-cholorostyrene; polyvinyltoluene; styrene-p-chlorostyrene copolymer; and styrene-vinyltoluene copolymer; copolymers of styrene and acrylic acid esters such as: styrenemethylacrylate copolymer; styrene-ethylacrylate copolymer; and styrene-n-butyl acrylate copolymer; copolymers of styrene and methacrylic acid esters such as: styrene-methyl methacrylate copolymer; styrene-ethyl methacrylate copolymer; styrene-n-butyl methacrylate copolymer; and multi-component copolymers of styrene, acrylic acid ester and methacrylic acid esters; copolymers of styrene and other vinyl monomers such as: styrene-acrylonitrile copolymer, styrene-methyl ether copolymer; styrene-butadienee copolymer; styrene-vinyl methyl ketone copolymer; styrene-acrylonitrileindene copolymer; styrene maleic acid ester copolymer; and the like. These binder resins may be used singly or in combination. Generally, resins particularly suitable for use in xerographic toner manufacturing have a melting point (ring and ball method) in the range of 100° C. to 135° C. and have a glass transition temperature (Tg) greater than about 60° C. Examples of styrenic polymer-based resin particles and suitable amounts can also be found in U.S. Pat. Nos. 5,278,018; 5,510,221; 5,275,900; 5,571,654; 5,484,575; and EP 0 720 066 A1, all incorporated in their entirety by reference herein.

Generally, the carbon black of the present invention, alone or with other pigments, is present in total amounts of from about 1% by weight to about 30% by weight of the toner or developer composition. The amount of pigment present in the toner composition is preferably from about 0.1 to about 12 wt parts per 100 wt parts of resin, However, lesser or greater amounts of the carbon black may be used. Also, generally, the toner resin is present in amounts of from about 60% by weight to about 99% by weight of the toner or developer composition.

Optional external additives may also be mixed or blended with the toner compositions of the present invention including carrier additives; additional positive or negative charge controlling agents such as quaternary ammonium salts, pyridinum salts, sulfates, phosphates, and carboxylates; flow aid additives, silicone oils; waxes such as commercially available polypropylenes and polyethylenes; magnetite; and other known additives. Generally, these additives are present in amounts of from about 0.05% by weight to about 30% by weight, however, lesser or greater amounts of the additives may be selected depending on the particular system and desired properties. Specific examples of additives and amounts are also described in the patents and the European patent application mentioned above and incorporated herein by reference.

The toner compositions can be prepared by a number of known methods, such as admixing and heating the resin, the carbon black particles, optional charge enhancing additives and other additives in conventional melt extrusion devices and related equipment. Other methods include spray drying and the like. Compounding of the carbon black and other ingredients with the resin is generally followed by mechanical attrition and classification to provide toner particles having a desired particle size and particle size distribution. Conventional equipment for dry blending of powders may be used for mixing or blending the carbon black particles with the resin. Again, conventional methods of preparing toner and developer compositions can be used and are described in the patents and European application described above and incorporated herein by reference.

In more detail, the toner material can be prepared by dry blending the binder resin with all other ingredients, including the pigment, and then melt-extruding in a high shear mixer to form a homogeneously mixed mass. During this process the components are held at a temperature above the melting point of the binder resin, and those components that are insoluble in the resin are ground so that their average particle size is reduced. This homogeneously mixed mass is then allowed to cool and solidify, after which it is pre-ground to an average particle size of about 100 microns. This material is then further subjected to particle size reduction until its average particle size meets the size range specification required for classification. A variety of classifying techniques may be used. The preferred type is an air classification type. By this method, particles in the ground material which are too large or too small are segregated from the portion of the material which is of the desired particle size range.

The toner composition of the present invention may be used alone in monocomponent developers or may be mixed with suitable carrier particles to form dual component developers. The carrier vehicles which can be used to form dual component developer compositions can be selected from various materials. Such materials typically include carrier core particles and core particles overcoated with a thin layer of film-forming resin to help establish the correct triboelectric relationship and charge level with the toner employed. Suitable carriers for two component toner compositions include iron powder, glass beads, crystals of inorganic salts, ferrite powder, nickel powder, all of which are typically coated with resin coating such as an epoxy or fluorocarbon resin. Examples of carrier particles and coatings that can be used and are described in the patents and European application described above and incorporated herein by reference.

The present invention is further directed to a method of imaging which includes formulating an electrostatic latent image on a negatively charged photoconductive imaging member, affecting the development thereof with toner composition comprising resin particles and carbon black particles, and thereafter transferring the developed image onto a suitable substrate. Conventional methods of imaging can be used, such as shown in the patents and European patent application described above.

The carbon blacks of the present invention can also be used as a component in molding, films, or pipes. Conventional formulations can be used but wherein the carbon black of the present invention is present instead of conventional carbon black. Various articles containing the low PAH amount carbon blacks of the present invention provides one or benefits, including an article that contains less PAH.

The present invention will be further clarified by the following examples, which are intended to be exemplary of the present invention.

EXAMPLES

Example 1

The carbon black samples that are included in the study are the materials manufactured by Cabot Corporation with a furnace process (see, J. B. Donnet, R. C. Bansal, M. J. Wang, "Carbon Black," SCIENCE AND TECHNOLOGY, $2^{nd}$ Edition, Marcel Dekker, NY, 1993; and M. J. Wang, C. A. Gray, S. A. Reznek, K. Mahmud, Y. Kutsovsky, "Carbon Black," in KIRK-OTHMER ENCYCLOPEDIA OF CHEMICAL TECHNOLOGY, John Willey & Sons, 2005, 4, 761). The properties of carbon black are defined by the ASTM (see, ASTM D 1765-03 Standard Classification System for Carbon Blacks Used in Rubber Products) and by the Cabot specifications (see, Web site www.cabot-corp.com).

The carbon blacks were evaluated in the SBR rubber compound by the ASTM (see, ASTM D 3191-02 Standard Test Methods for Carbon Black in SBR—Recipe and Evaluation Procedures). Typical rubber mixing processes and tests are described in Maurice Morton, RUBBER TECHNOLOGY, 3rd Edition, Van Norstrand Reinhold Company, New York, 1987, and 2nd Edition, Van Norstrand Reinhold Company, New York, 1973). Testing of bound rubber is described in G. Kraus, RUBBER CHEM TECHN, v 38, 1070 (1965) and S. Wolff, M-J Wang, E-H Tan, RUBBER CHEM TECHN, v 66, 163 (1993). Max Tan Delta is a measure of hysteresis (rolling resistance) of rubber. It was tested using an ARES/Rheometrics Dynamic Spectrometer II (RDS II, Rheometrics, Inc., N.J.) operated in a torsion strain mode (shear). The measurements were performed at 0° C. for strain sweeps with double strain amplitude (DSA) ranging from 0.2 to 120%, at a constant frequency of 10 Hz. Wear resistance was tested using the Cabot Abrader (see, U.S. Pat. No. 4,995,197).

Testing of PAH concentrations was conducted by the Cabot procedure that includes extraction by toluene with GCMS analysis for 22 individual PAHs, as identified in FIG. 1. The method is described in 21 C.F.R. part 17B, FDA FEDERAL REGISTER, v62, #90. Friday, May 9, 1997.

Example 2

In the examples below, two commercially available carbon blacks from Cabot Corporation were tested, namely Vulcan® 7H carbon black and Vulcan® J carbon black. The carbon blacks were subjected to two techniques to remove PAH is, namely extraction by a Soxhlet extraction or the heating of the carbon black. In particular, the extraction and heating tests are set forth below.

Extraction of 100 gm samples of carbon black was conducted in Soxhlets for 48 hours with 1500 ml of toluene.

Heating of the carbon black was conducted in an oven with circulation of air or a nitrogen environment. A tray with the size of 1"×12"×12" was used to spread a 100 gm carbon black sample. Temperature of heating varied between 285 C and 500 C. Each heating condition was applied for 1 hour period. Heating temperatures and environments are specified in Table 1 and 2 for each studied sample of carbon black.

The results of this testing are set forth below. As can be seen, the extraction by use of a solvent and the removal of PAHs by the use of heat was effective to significantly reduce the PAH and, in particular, the PAH 22. More importantly, the mechanical properties achieved in the elastomer composition or rubber matrix were substantially maintained irrespective of the PAH, which was quite surprising and important if low PAH amount carbon black, especially rubber grades, are considered to be acceptable to the tire industry and rubber industry.

TABLE 1

| ASTM # | CB Cabot Name | Treatment | Heat | Envirnmt | BaP, ppm | PAH8, ppm | PAH22, ppm | Elongation, % |
|---|---|---|---|---|---|---|---|---|
| N375 | VJ | none | none | Std | 16 | 38 | 770 | 415 |
| N234 | V7H | none | none | Std | 12 | 34 | 860 | 420 |
| N234 | V7H | Heat | 285 | Std | 12 | 34 | 840 | 429 |
| N234 | V7H | Heat | 400 | Std | 6 | 18 | 380 | 429 |
| N234 | V7H | Heat | 500 | Std | 3 | 8.4 | 124 | 436 |
| N234 | V7H | Extraction | none | Toluene | 2.3 | 4.79 | 140 | 431 |
| N375 | VJ | Extraction | none | Toluene | 1.2 | 2.59 | 52 | 431 |

TABLE 2

| ASTM # | Tensile strength, Mpa | 100% Modulus, Mpa | 300% Modulus, Mpa | M300/M100 | Abr Res, 21% slip | Bound Rubber, % | Max Tan Delta@0 C. |
|---|---|---|---|---|---|---|---|
| N375 | 27.69 | 3.6 | 19.03 | 5.29 | 134 | 19.02 | 0.352 |
| N234 | 28.17 | 3.64 | 18.24 | 5.01 | 157 | 19.7 | 0.362 |
| N234 | 28.54 | 3.68 | 18.83 | 5.12 | 162 | 19.28 | 0.358 |
| N234 | 29.02 | 3.94 | 19.28 | 4.89 | 165 | 19.76 | 0.359 |
| N234 | 29.35 | 3.64 | 19.09 | 5.24 | 158 | 20.74 | 0.357 |
| N234 | 26.76 | 3.22 | 17.05 | 5.3 | 143 | 19.83 | 0.361 |
| N375 | 27.5 | 3.26 | 17.43 | 5.35 | 130 | 18.7 | 0.355 |

Example 3

This experiment was carried out for production of carbon blacks with very low PAH content by hot gas separation. PAH molecules are reformed in the reactor at high temperatures and as the reactor stream is cooled, they condense on the surface of carbon black. The experiment employed a cyclone to separate tail gas from carbon black at a temperature of about 750° C., such that the PAH molecules remained in the gas phase and were not allowed to condense on the carbon black. The carbon black was an STSA equivalent of V7H (112 $m^2/g$). During the collection of the sample through a cyclone by drawing a side-stream from the reactor, samples from MUF (Main Unit Filter) and pelletizer were also collected as controls. The carbon black collected in the cyclone had a total PAH content of about ~16 ppm, which turned out to be two orders of magnitude lower than the control samples collected as a part of standard manufacturing procedure. A study of natural rubber compound properties showed that the low PAH amount carbon black thus collected was equivalent in performance to the control samples.

Hot gas separation of carbon black was performed in the pilot plant reactor using a cyclone ("cyclone" in the tables is a reference to these samples of the present invention) to reduce the condensation of PAH on carbon black. The goal was to separate kilogram quantity of black, study the PAH and also the compound properties along with the control samples (separated by regular process in the MUF). The experiment drew a side stream from the carbon black reactor for the hot gas separation. In lieu of cyclone recovery of low PAH amount blacks, high temperature filtration could be used. For instance, ceramic filters (manufacturer: Caldo) or sintered metal filters (manufacturer: Applied Porous Technologies) that can sustain the desired temperatures of separation (~750° C.) can be used.

The place used for drawing a reactor sample for separation was between the reactor quench and the heat exchanger, since the reactor temperature downstream of quench is of the order of 750° C. and that there would be several quench ports available for drawing the sample. The experiment involved separation of carbon black from tail gas while hot, and secondly, cooling of carbon black to temperatures below ~200° C. before exposure to air to preferably avoid oxidation of the surface. In the experiment, a cyclone separation system was connected to one of the quench ports downstream of the reactor quench, the carbon black dropped into a container attached to the bottom of the cyclone, while the lean tail gas (stripped off of carbon black) was forced back into the reactor downstream using an eductor (quench aspirator, in this case) with 100 psi steam line as the motive flow. Temperature of separation was measured at different locations in the sampling system. The sampling system was connected to an off-line reactor section to determine if the suction created by steam eductor was sufficient for the sampling system to draw a stream out of the reactor.

Figure 5:
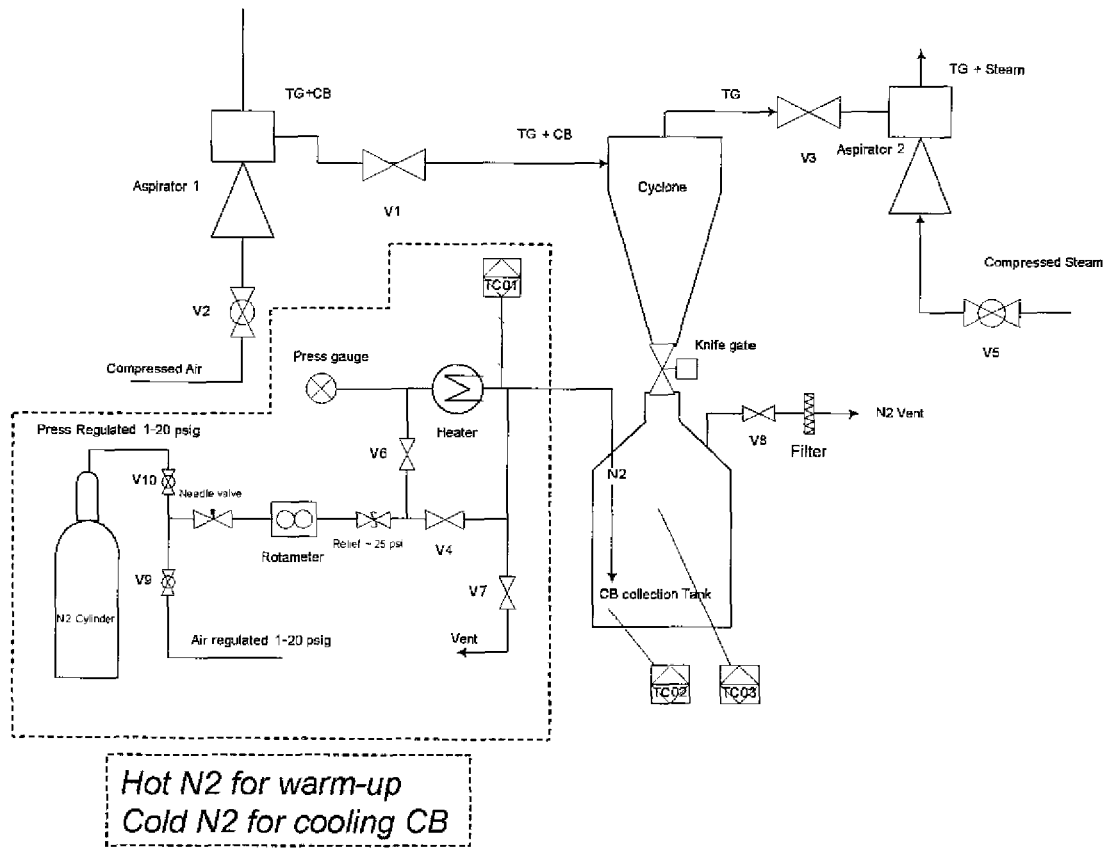
FIG. 5 is a diagram showing an example of a cyclone recovery system.

The entire sampling system, mainly the sample container at the bottom of the cyclone, was pre-heated to avoid any condensation of PAH while the system was cold. Though optional, hot $N_2$ (@800° C.) was sparged through two sintered metal porous tubes, placed diametrically opposite inside the container. The same tubes were used for cooling the carbon black after collection by sparging cold $N_2$ through the tubes. Two thermocouples, one at the center of the container and the other along the periphery (one inch from the wall, and one inch from the bottom) were used as indicators of the carbon black sample temperature. A detailed diagram is shown in FIG. 5.

The reactor was making carbon black of an STSA equivalent to V7H (~112 m²/g) since the heat treatment experiments were performed on V7H. The goal was to keep the quench extremely short to make a low spec 20 black and then collect the hot-separated sample. Wet pellets and fluffy samples from the MUF were collected at the same time as control samples. Spec 20 is a reference to Toluene Discoloration (tested per ASTM D1618).

The main mechanism for the tail gas to get into the sampling tank was by diffusion (since it was a dead end to the flow stream) and would not result in significant PAH condensation. Thus, the experiment was carried out without preheating the sampling system. The Spec 20 of the fluffy sample from the MUF was brought down in the fifties, by moving the quench upstream which was finally at 2'9" pointed upstream.

Table 3 shows PAH and other data for different samples. WP refers to wet pellet carbon black wherein the sample is taken prior to going to the dryer.

TABLE 3

PAH results on different samples. Data shown are average of two measurements.

| Sample | Total PAH (ppm) | comment |
|---|---|---|
| Cyclone | 16.3 | 1 hour collection |
| WP | 1887.4 | control |
| MUF | 970.6 | control |

PAH measured on MUF and WP samples were significantly higher than that collected in the cyclone via hot gas separation. The collection time was an hour, and the PAH levels were about ~16 ppm due to the fact that the sampling system was hot and at steady state separation temperature of about ~700° C. for most of the sampling duration.

Figure 3:
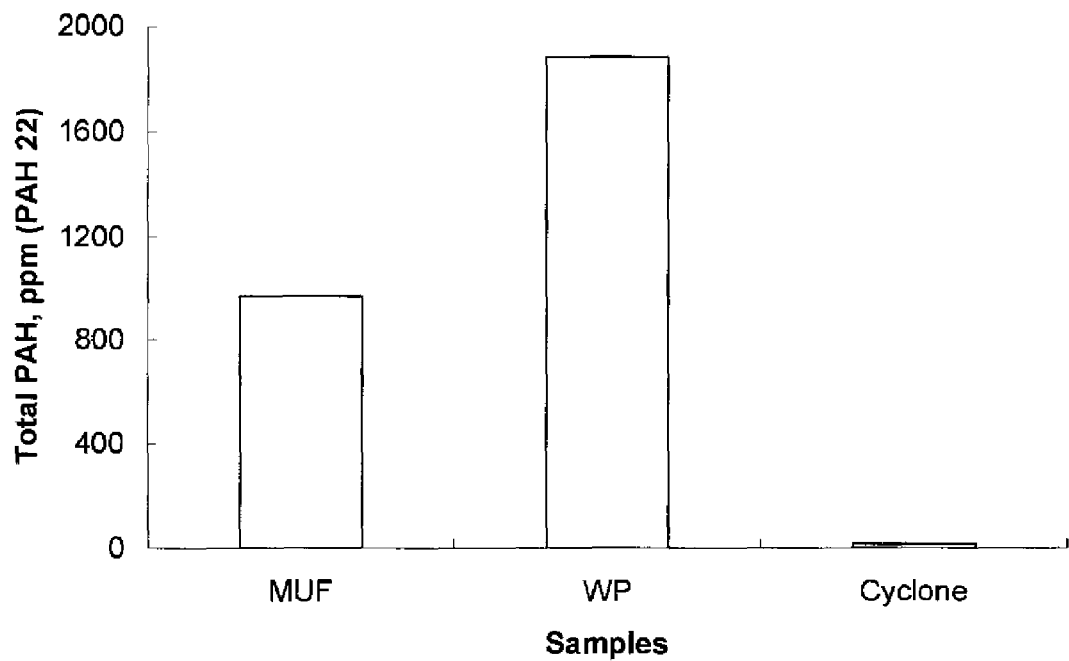
FIG. 3 is a bar graph showing total PAH for three samples, one of which has a low total concentration of PAH.
Figure 4:
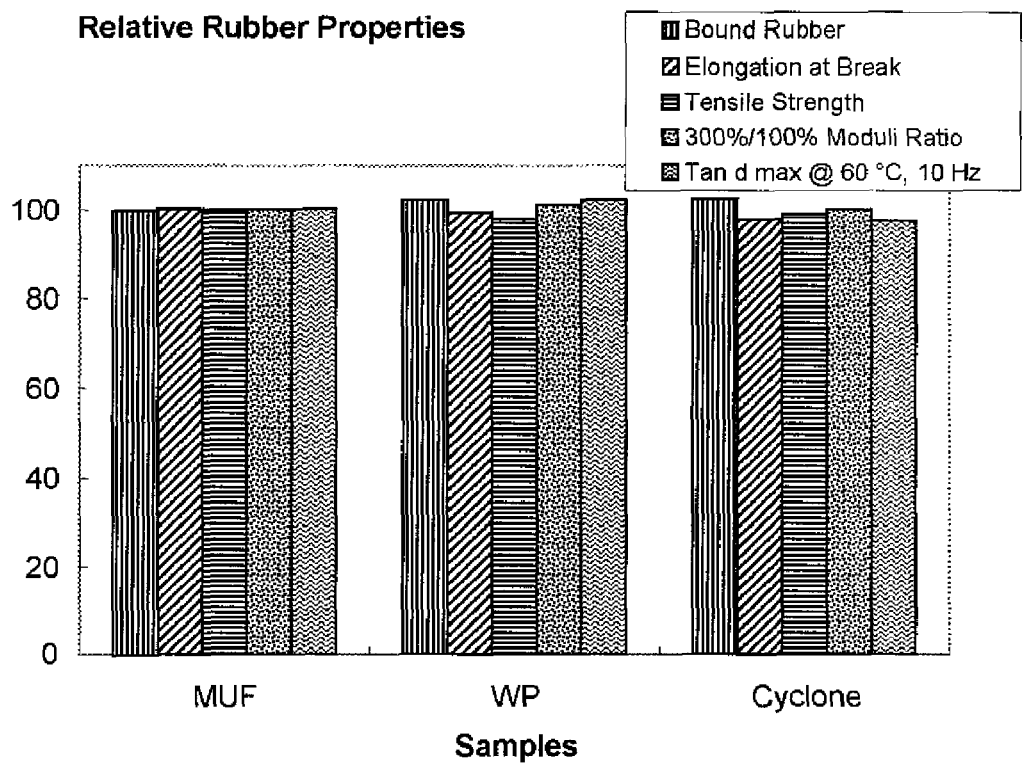
FIG. 4 is a bar graph showing relative rubber properties for the three samples.

Table 4 shows the summary of results for, spec 20, PAH measurements and major compound properties relative to the MUF fluffy, which was the control sample. The data shown in the table with asterisk is an average value of two data points and the errors are also based on two measurements. It is clear from the results that, while the PAH on the black was reduced by two orders of magnitude, the compound properties measured were equivalent, within experimental errors. The active hydrogen content measured by proton extraction, appear to be very close while the spec 20 and total PAH were very different between the cyclone and the control samples. This is indicative of the fact that, while the PAHs were removed (or not allowed to condense on the surface of black), the surface chemistry of the black remained unaffected (measured by active H content) thus resulting in very similar compound properties. FIGS. 3 and 4 are graphical representations of measured PAH and compound properties, again showing that the removing the PAH by the above described method, does not affect the reinforcing properties of the black.

TABLE 4

| | Sample | MUF | WP | Cyclone |
|---|---|---|---|---|
| Surface Area | BET(m²/g) | 113.3 | 116.2 | 120.2 |
| | STSA(m²/g) | 108 | 111.4 | 110.2 |
| | I2 (mg/g) | 113.8 | 105.7 | 121.4 |
| Surface Chemistry | H content (ppm) | 4020 | 3981 | 3827 |
| | SP20 (%) | 42.0 | 62.3 | 94.5 |
| | PAH 22* (ppm) | 970.5 | 1887.5 | 16.0 |
| Rubber Properties Relative to MUF fluffy* | Bound Rubber | 100.0 ± 1.5 | 102.2 ± 2.3 | 102.4 ± 0.8 |
| | Elongation at Break | 100.0 ± 4.6 | 99.4 ± 3.3 | 97.7 ± 1.8 |
| | Tensile Strength | 100.0 ± 6.9 | 97.7 ± 4.0 | 98.9 ± 3.9 |
| | 300%/100% Moduli Ratio | 100.0 ± 1.4 | 100.9 ± 1.2 | 100.0 ± 0.3 |
| | Tan δ max @ 60° C., 10 Hz | 100.0 ± 2.7 | 102.2 ± 1.9 | 97.3 ± 2.0 |
| | Abrasion Index (7% slip) | 100.0 ± 1.6 | 103.2 ± 1.6 | 93.4 ± 5.3 |
| | Abrasion Index (14% slip) | 100.0 ± 1.1 | 102.2 ± 1.1 | 102.2 ± 3.3 |

*Reported values and errors based on two tests

The side-stream sampling for hot gas separation of carbon black from tail gas using cyclone was successful in reducing the PAH contamination of carbon black by two orders of magnitude. After treatment of carbon black can occur in a steam fluidized bed.

As an alternative, the MUFs can be replaced with filter houses having ceramic filters which can operate at temperatures of around 1000° C. The hot carbon black then dropping out of the rotary lock, can be conveyed with steam which in turn will also cool the carbon black to the required temperature to be fed to the pelletizer, or it can be conveyed with cold tail gas after stripping it off of the PAHs. The tail gas thus available from the process will have lot more recoverable energy; it will be "less wet" since such a process would not require water spray in the venturi cooler, and make the tail gas more conducive to recycle in the burner as fuel.

Example 4

In this example, Example 2 was repeated except different carbon blacks, as listed below in the tables were used and treated to remove PAHs.

| | CB Properties | | | |
|---|---|---|---|---|
| | Typical | | | |
| CB ID | STSA ($m^2/g$) | I2 (mg/g) | I/STSA | PAH22 (ppm) |
| N299 Control A | 97 | 108 | 1.11 | 70 |
| N299 Extracted A | | | | 24 |
| N121 Control A | 114 | 121 | 1.06 | 740 |
| N121 Extracted A | | | | 95 |
| N299 Control B | 97 | 108 | 1.11 | 105 |
| N299 Extracted B | | | | 27 |
| N121 Control B | 114 | 121 | 1.06 | 530 |
| N121 Extracted B | | | | 91 |

| | 60 min @ 150° C. RPA | | | | | 100 MOONEY Viscosity | 120 SCORCH Scorch | BOUND |
|---|---|---|---|---|---|---|---|---|
| Sample Name | ts2 time (min) | t'50 time (min) | t'90 time (min) | Min Torque | Max Torque | ML(1 + 4) 24 Hrs. | ML(1 + t5) (min) | RUBBER Ave (%) |
| N299 Original A | 6.38 | 14.71 | 30.14 | 5.09 | 31.67 | 97.93 | 49.85 | 26 |
| N121 Original A | 5.51 | 12.86 | 28.44 | 5.45 | 32.90 | 102.95 | 43.41 | 32 |
| N299 Original B | 6.97 | 15.16 | 30.92 | 4.97 | 32.15 | 96.03 | 48.34 | 26 |
| N121 Original B | 6.27 | 14.11 | 31.15 | 5.51 | 32.51 | 103.27 | 49.26 | 31 |
| N299 Extracted A | 6.39 | 14.35 | 30.25 | 5.03 | 31.67 | 94.65 | 48.79 | 27 |
| N121 Extracted A | 5.99 | 13.65 | 31.00 | 6.01 | 33.62 | 102.04 | 43.76 | 32 |
| N299 Extracted B | 7.14 | 15.30 | 31.73 | 4.94 | 31.85 | 92.01 | 48.80 | 26 |
| N121 Extracted B | 6.33 | 14.34 | 31.52 | 5.49 | 32.43 | 101.27 | 49.21 | 30 |
| N121 Extracted B | 6.30 | 14.26 | 31.59 | 5.48 | 32.50 | 100.68 | 48.60 | 31 |
| N299 Extracted B | 7.11 | 15.22 | 31.53 | 4.89 | 31.72 | 92.65 | 48.77 | 25 |
| N121 Extracted A | 5.77 | 13.39 | 29.45 | 5.46 | 32.55 | 100.44 | 45.37 | 31 |
| N299 Extracted A | 6.56 | 14.61 | 31.21 | 5.12 | 31.76 | 94.95 | 48.37 | 27 |
| N121 Original B | 6.14 | 14.04 | 31.94 | 5.74 | 33.51 | 100.35 | 47.70 | 32 |
| N299 Original B | 7.05 | 15.32 | 32.26 | 5.04 | 32.29 | 93.53 | 46.80 | 26 |
| N121 Original A | 5.43 | 12.20 | 25.54 | 5.16 | 29.81 | 103.49 | 41.30 | 32 |
| N299 Original A | 6.40 | 14.32 | 31.54 | 5.43 | 32.73 | 97.45 | 46.77 | 29 |

| | TENSILE | | | | | | |
|---|---|---|---|---|---|---|---|
| Sample Name | Elongation at Break (%) | Tensile (Mpa) | 25% mod. (Mpa) | 50% mod. (Mpa) | 100% mod. (Mpa) | 200% mod. (Mpa) | 300% mod. (Mpa) |
| N299 Original A | 433 | 28.91 | 1.42 | 2.02 | 3.69 | 10.67 | 19.25 |
| N121 Original A | 418 | 30.03 | 1.50 | 2.16 | 3.96 | 11.64 | 20.83 |
| N299 Original B | 411 | 27.92 | 1.44 | 2.11 | 3.95 | 11.08 | 19.51 |
| N121 Original B | 412 | 29.46 | 1.51 | 2.17 | 3.96 | 11.31 | 20.36 |
| N299 Extracted A | 436 | 29.25 | 1.43 | 2.06 | 3.70 | 10.76 | 19.26 |
| N121 Extracted A | 389 | 28.52 | 1.57 | 2.28 | 4.18 | 11.78 | 21.12 |
| N299 Extracted B | 416 | 27.92 | 1.40 | 2.01 | 3.72 | 10.67 | 18.96 |
| N121 Extracted B | 434 | 30.41 | 1.52 | 2.18 | 3.87 | 10.65 | 19.56 |
| N121 Extracted B | 433 | 29.82 | 1.49 | 2.11 | 3.81 | 11.01 | 19.88 |
| N299 Extracted B | 429 | 27.97 | 1.37 | 1.96 | 3.56 | 10.18 | 18.46 |
| N121 Extracted A | 405 | 28.54 | 1.48 | 2.15 | 3.84 | 10.86 | 19.72 |
| N299 Extracted A | 434 | 29.14 | 1.45 | 2.10 | 3.77 | 10.29 | 18.61 |
| N121 Original B | 435 | 30.53 | 1.54 | 2.23 | 3.97 | 10.99 | 20.09 |
| N299 Original B | 425 | 28.54 | 1.44 | 2.09 | 3.81 | 10.85 | 19.28 |
| N121 Original A | 435 | 31.59 | 1.49 | 2.15 | 3.91 | 11.34 | 20.48 |
| N299 Original A | 433 | 30.48 | 1.46 | 2.09 | 3.84 | 11.13 | 20.05 |

| Sample Name | REBOUNDS R/T Avgs. | HARDNESS RT Avgs. | REBOUNDS 70 oc Avgs. | ABRASION Wear Avg. (Lab Index) 14% Slip | Wear Avg. (Lab Index) 21% Slip |
|---|---|---|---|---|---|
| N299 Original A | 42.1 | 70.8 | 50.3 | 145 | 152 |
| N121 Original A | 41.3 | 71.8 | 50.3 | 155 | 168 |
| N299 Original B | 42.9 | 70.4 | 50.8 | 131 | 135 |
| N121 Original B | 40.8 | 71.0 | 49.3 | 156 | 160 |
| N299 Extracted A | 41.6 | 69.8 | 48.9 | 136 | 146 |
| N121 Extracted A | 42.1 | 70.8 | 50.6 | 145 | 161 |
| N299 Extracted B | 42.3 | 69.6 | 49.7 | 120 | 133 |
| N121 Extracted B | 41.2 | 70.9 | 50.6 | 150 | 153 |
| N121 Extracted B | 41.1 | 70.1 | 48.4 | 142 | 154 |
| N299 Extracted B | 42.1 | 70.0 | 49.9 | 126 | 130 |
| N121 Extracted A | 41.8 | 70.5 | 49.3 | 140 | 159 |
| N299 Extracted A | 41.2 | 70.2 | 48.7 | 129 | 139 |
| N121 Original B | 41.7 | 70.3 | 49.0 | 153 | 162 |
| N299 Original B | 41.4 | 70.8 | 50.0 | 129 | 133 |
| N121 Original A | 42.1 | 71.9 | 49.6 | 151 | 157 |
| N299 Original A | 41.9 | 70.6 | 50.0 | 147 | 142 |

| Sample Name | SWELLS Vr Ave | Swell Index Ave | SPECIFIC GRAVITY DensiTECH in H20 | RHEOMETRICS Max Tan Delta @ 70° C. | Max Tan Delta @ 0° C. |
|---|---|---|---|---|---|
| N299 Original A | 0.23 | 2.01 | 1.1328 | 0.193 | 0.330 |
| N121 Original A | 0.23 | 2.01 | 1.1281 | 0.192 | 0.322 |
| N299 Original B | 0.23 | 2.01 | 1.1327 | 0.197 | 0.334 |
| N121 Original B | 0.23 | 2.00 | 1.1307 | 0.199 | 0.355 |
| N299 Extracted A | 0.23 | 2.05 | 1.1325 | 0.201 | 0.341 |
| N121 Extracted A | 0.23 | 1.98 | 1.1301 | 0.195 | 0.333 |
| N299 Extracted B | 0.23 | 2.03 | 1.1318 | 0.204 | 0.341 |
| N121 Extracted B | 0.23 | 2.02 | 1.1325 | 0.208 | 0.343 |
| N121 Extracted B | 0.23 | 2.03 | 1.1313 | 0.200 | 0.334 |
| N299 Extracted B | 0.23 | 2.04 | 1.1327 | 0.201 | 0.337 |
| N121 Extracted A | 0.23 | 2.00 | 1.1280 | 0.195 | 0.325 |
| N299 Extracted A | 0.23 | 2.00 | 1.1309 | 0.205 | 0.330 |
| N121 Original B | 0.23 | 1.97 | 1.1313 | 0.204 | 0.330 |
| N299 Original B | 0.23 | 2.01 | 1.1331 | 0.203 | 0.341 |
| N121 Original A | 0.23 | 1.96 | 1.1282 | 0.198 | 0.333 |
| N299 Original A | 0.23 | 1.97 | 1.1330 | 0.196 | 0.334 |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A carbon black having a low PAH content, wherein the PAH content is determined based on a PAH22 content, said carbon black is a furnace carbon black and has a STSA, $I_2$No/STSA ratio, and PAH content as follows:
   a) STSA: 110-250 m$^2$/g
      $I_2$No (mg/g)/STSA (m$^2$/g): 1.20 to 0.70
      PAH: 400 ppm or less; or
   b) STSA: 80-110 m$^2$/g
      $I_2$No (mg/g)/STSA (m$^2$/g): 1.15 to 0.70
      PAH: 30 ppm or less; or
   c) STSA: 65-75 m$^2$/g
      $I_2$No (mg/g)/STSA (m$^2$/g): 1.10-0.88
      PAH: 500 ppm or less
      DBP: 115-125 mL/100 g; or
   d) STSA: 65-80 m$^2$/g
      $I_2$No (mg/g)/STSA (m$^2$/g): 0.70 to 0.88
      PAH: 500 ppm or less; or
   e) STSA: 1 to 35 m$^2$/g
      $I_2$No (mg/g)/STSA (m$^2$/g): 1.40 to 0.70
      PAH: 50 ppm or less; or
   f) STSA: 70 to 90 m$^2$/g
      $I_2$No (mg/g)/STSA (m$^2$/g): 1.00 to 1.20
      PAH: 50 ppm or less DBP: 60-80 mL/100 g; or
g) STSA: 87-95 m$^2$/g
   I$_2$No (mg/g)/STSA (m$^2$/g): 0.91 to 1.08
   PAH: 100 ppm or less
   DBP: 109-119 mL/100 g,
wherein said carbon black has one or more of the following mechanical properties or rubber properties when included in a rubber formulation according to ASTM D 3191-02:
abrasion resistance (21% slip) of from 80 to 170;
elongation (%) of from 300 to 600;
tensile strength (Mpa) of from 20 to 35;
100% modulus (Mpa) of from 2.4 to 4.5;
300% modulus (Mpa) of from 12 to 23;
ratio of 300% modulus/100% modulus (M300%/M100%) of from 3.5 to 6;
bound rubber (%) of from 15 to 30; and/or
max tan delta @ 0° C. of from 0.25 to 0.4.

2. The carbon black of claim 1, wherein said carbon black is a) and has an I$_2$No (mg/g)/STSA (m$^2$/g) of 1.15 to 0.70.

3. The carbon black of claim 2, wherein said carbon black has a STSA of 110 to 200 m$^2$/g.

4. The carbon black of claim 2, wherein said carbon black has a STSA of 110 to 175 m$^2$/g.

5. The carbon black of claim 4, wherein said carbon black has a PAH content of 1 ppm to 200 ppm.

6. The carbon black of claim 4, wherein said carbon black has a PAH content of 1 ppm to 50 ppm.

7. The carbon black of claim 4, wherein said carbon black has a PAH of 1 ppm to 150 ppm.

8. The carbon black of claim 4, wherein said carbon black has a PAH content of 1 ppm to 100 ppm.

9. The carbon black of claim 4, wherein said carbon black has a PAH of 20 ppm or less.

10. The carbon black of claim 2, wherein said carbon black has a STSA of 110 to 150 m$^2$/g.

11. The carbon black of claim 2, wherein said carbon black has a I$_2$No/STSA of 1.15 to 0.9.

12. The carbon black of claim 1, wherein said carbon black is b) and said I$_2$No/STSA is 1.10 or less.

13. The carbon black of claim 12, wherein said PAH content is 1 ppm to 20 ppm.

14. The carbon black of claim 12, wherein said PAH content is 10 ppm or less.

15. The carbon black of claim 1, wherein said carbon black is c).

16. The carbon black of claim 15, wherein said PAH content is 1 ppm to 100 ppm.

17. The carbon black of claim 1, wherein said carbon black is d).

18. The carbon black of claim 17, wherein said PAH content is 1 ppm to 300 ppm.

19. The carbon black of claim 17, wherein said PAH content is 1 ppm to 150 ppm.

20. The carbon black of claim 17, wherein said PAH content is 1 ppm to 100 ppm.

21. The carbon black of claim 17, wherein said PAH content is 1 ppm to 50 ppm.

22. The carbon black of claim 17, wherein said PAH content is 20 ppm or less.

23. The carbon black of claim 1, wherein said carbon black is e).

24. The carbon black of claim 23, wherein said PAH content is 1 ppm to 20 ppm.

25. The carbon black of claim 23, wherein said PAH content is 10 ppm or less.

26. The carbon black of claim 1, wherein said carbon black is f).

27. The carbon black of claim 26, wherein said carbon black has a DBP of 72 mL/100 g, an STSA of 76 m$^2$/g, and an I$_2$No/STSA of 1.05 to 1.09, and PAH content of 50 or less.

28. The carbon black of claim 26, wherein the DBP is 66-77 mL/100 g or less.

29. The carbon black of claim 26, wherein said DBP is 60 mL/100 g to 72 mL/100 g.

30. The carbon black of claim 26, wherein said PAH content is 1 ppm to 20 ppm.

31. The carbon black of claim 26, wherein said PAH content is 10 ppm or less.

32. A method to produce the carbon black of claim 1, said method comprising subjecting or treating a carbon black having a PAH content to/with sufficient heat, optionally in an inert or vacuum atmosphere, such that the PAH or a portion thereof is removed to form said carbon black.

33. The method of claim 32, wherein said heat is on the order of from about 300° C. to about 950° C.

34. A method to produce the carbon black of claim 1, said method comprising subjecting a carbon black having a PAH above 500 ppm to one or more solvent extractions.

35. A method to produce the carbon black of claim 1, wherein during manufacturing of carbon black involving the presence of hot tail gas containing a carbon black and PAH, said method comprising removing said hot tail gas with PAH from said carbon black.

36. The method of claim 35, wherein said removing of said hot tail gas is at a temperature of from about 260° C. to about 950° C.

37. The method of claim 35, wherein said removing of said hot tail gas is at a temperature of from about 500° C. to about 900° C.

38. The method of claim 35, wherein said carbon black is a furnace carbon black and said method occurs in a furnace carbon black reactor.

39. The method of claim 35, wherein a cyclone is used to remove said hot tail gas from said carbon black.

40. The method of claim 35, wherein a high temperature filter is used to remove said hot tail gas from said carbon black.

41. The method of claim 35, wherein after separating said carbon black from said hot tail gas, said carbon black has a carbon black temperature above 200° C., and said method further comprising lowering the carbon black temperature to below 200° C. prior to introducing said carbon black into a bag filter.

42. The method of claim 35, wherein after separating said carbon black from said hot tail gas, said carbon black has a carbon black temperature above 400° C., and said method further comprising lowering the carbon black temperature to below 400° C. prior to introducing said carbon black into a bag filter.

43. The method of claim 35, wherein said PAH remains in a gas phase and does not condense of said carbon black.

44. The method of claim 43, wherein said recycling comprises re-using said hot tail gas in a carbon black manufacturing process.

45. The method of claim 43, wherein said recycling comprises re-using said hot tail gas as a heat source.

46. The method of claim 45, wherein said hot tail gas is used as at least a partial heat source for a dryer.

47. The method of claim 45, wherein said dryer is a carbon black dryer.

48. The method of claim 45, wherein said dryer is operated at a sufficient temperature such that the PAH in said hot tail gas is destroyed.

49. The method of claim 35, further comprising recycling said hot tail gas with PAH.

50. The carbon black of claim 1, wherein said carbon black has a PAH content of from about 0.15 to about 2 micrograms/m$^2$.

51. The carbon black of claim 1, wherein said carbon black is a rubber grade or tire grade carbon black.

52. The carbon black of claim 1, wherein said carbon black is a N110-N787 ASTM carbon black.

53. A carbon black having a low PAH content, wherein the PAH content is determined based on a PAH22 content, said carbon black is a furnace carbon black and has a STSA, I2No/STSA ratio, and PAH content as follows:
   a) STSA: 110-250 m$^2$/g
      $I_2$No (mg/g)/STSA (m$^2$/g): 1.20 to 0.70
      PAH: 400 ppm or less; or
   b) STSA: 80-110 m$^2$/g
      $I_2$No (mg/g)/STSA (m$^2$/g): 1.15 to 0.70
      PAH: 30 ppm or less; or
   c) STSA: 65-75 m$^2$/g
      $I_2$No (mg/g)/STSA (m$^2$/g): 1.10-0.88
      PAH: 500 ppm or less
      DBP: 115-125 mL/100 g; or
   d) STSA: 65-80 m$^2$/g
      $I_2$No (mg/g)/STSA (m$^2$/g): 0.70 to 0.88
      PAH: 500 ppm or less; or
   e) STSA: 1 to 35 m$^2$/g
      $I_2$No (mg/g)/STSA (m$^2$/g): 1.40 to 0.70
      PAH: 50 ppm or less; or
   f) STSA: 70 to 90 m$^2$/g
      $I_2$No (mg/g)/STSA (m$^2$/g): 1.00 to 1.20
      PAH: 50 ppm or less
      DBP: 60-80 mL/100 g; or
   g) STSA: 87-95 m$^2$/g
      $I_2$No (mg/g)/STSA (m$^2$/g): 0.91 to 1.08
      PAH: 100 ppm or less
      DBP: 109-119 mL/100 g wherein said carbon black has the ability to impart at least one mechanical property in a rubber matrix, or an elastomeric composition, said at least one mechanical property is one or more of the following:

abrasion resistance (21% slip)—, elongation (%)—ASTM D 3191-02 Standard Test Methods for Carbon Black in SBR—Recipe and Evaluation Procedures, tensile strength (Mpa); ASTM D 3191-02 Standard Test Methods for Carbon Black in SBR—Recipe and Evaluation Procedures, 100% modulus (Mpa); ASTM D 3191-02 Standard Test Methods for Carbon Black in SBR—Recipe and Evaluation Procedures, 300% modulus (Mpa); ASTM D 3191-02 Standard Test Methods for Carbon Black in SBR—Recipe and Evaluation Procedures, ratio of 300% modulus/100% modulus (M300%/M100%); ASTM D 3191-02 Standard Test Methods for Carbon Black in SBR—Recipe and Evaluation Procedures, bound rubber (%); or max tan delta @ 0° C. tested with ARES/Rheometrics Dynamic Spectrometer II (RDS II, Rheometrics, Inc., N.J) operated in a torsion strain mode (shear) with measurements performed at 0° C. for strain sweeps with double strain amplitude (DSA) ranging from 0.2 to 120%, at a constant frequency of 10 Hz, and wherein at least one of said mechanical properties for said carbon black is within 10% of the value for the same mechanical property for the same type of carbon black having a PAH22 content of 600 ppm to 1,000 ppm.

* * * * *